United States Patent
Durdevic et al.

(10) Patent No.: US 10,457,352 B2
(45) Date of Patent: Oct. 29, 2019

(54) BICYCLE FRAME, ELECTRIC BICYCLE AND ENERGY ACCUMULATOR

(71) Applicant: Biketec AG, Huttwil (CH)

(72) Inventors: Ivica Durdevic, Huttwil (CH); Lukas Beat Studer, Olten (CH); Philipp Walter Suter, Emen (CH); Timo Woelk, Fischbachau (DE); Omar Afzal, München (DE)

(73) Assignee: BIKETEC AG, Huttwil (CH)

( * ) Notice: Subject to any disclaimer, the term of this patent is extended or adjusted under 35 U.S.C. 154(b) by 0 days.

(21) Appl. No.: 15/538,265

(22) PCT Filed: Dec. 22, 2015

(86) PCT No.: PCT/EP2015/080996
§ 371 (c)(1),
(2) Date: Jun. 21, 2017

(87) PCT Pub. No.: WO2016/102579
PCT Pub. Date: Jun. 30, 2016

(65) Prior Publication Data
US 2018/0001959 A1 Jan. 4, 2018

(30) Foreign Application Priority Data
Dec. 22, 2014 (DE) .......................... 10 2014 226 828

(51) Int. Cl.
*B62M 6/90* (2010.01)
*B62M 6/40* (2010.01)
(Continued)

(52) U.S. Cl.
CPC .............. *B62M 6/90* (2013.01); *B62K 11/02* (2013.01); *B62K 19/04* (2013.01); *B62K 19/30* (2013.01);
(Continued)

(58) Field of Classification Search
CPC ... B62M 6/90; B62M 6/60; B62J 11/00; B62J 99/00; B62K 11/02
See application file for complete search history.

(56) References Cited

U.S. PATENT DOCUMENTS 5,163,766 A * 11/1992 Fushimi ..................... B41J 3/36
101/288
6,148,944 A * 11/2000 Adomi ....................... B62M 6/60
180/206.4
(Continued)

FOREIGN PATENT DOCUMENTS

CA 2846617 A1 * 1/2013 .............. B62J 99/00
DE 20 2008 009 933 U1 10/2008
(Continued)

OTHER PUBLICATIONS

International Search Report and Written Opinion for International Application No. PCT/EP2015/080996, dated Mar. 7, 2016, 9 pages.
(Continued)

Primary Examiner — Kevin Hurley
(74) Attorney, Agent, or Firm — Westman, Champlin & Koehler, P.A.

(57) ABSTRACT

A bicycle frame is disclosed, having at least one frame portion which is configured for the removable mounting of at least one separate energy storage device, in particular a battery pack. According to the invention, the frame portion configured for the removable mounting of the energy storage device has an asymmetric cross section with respect to a frame center plane. An electric bicycle according to the invention has a frame portion which is configured for the removable mounting of at least one separate energy storage device, the frame portion having an asymmetric cross section with respect to a frame center plane. Furthermore, an energy storage device is disclosed, having an asymmetric
(Continued)

cross section with respect to an energy storage device center plane.

13 Claims, 10 Drawing Sheets

(51) Int. Cl.
    *B62K 19/04*     (2006.01)
    *B62K 19/40*     (2006.01)
    *B62K 19/30*     (2006.01)
    *B62K 11/02*     (2006.01)

(52) U.S. Cl.
    CPC ............... *B62K 19/40* (2013.01); *B62M 6/40* (2013.01); *B62K 2208/00* (2013.01)

(56) References Cited

U.S. PATENT DOCUMENTS

| | | | |
|---|---|---|---|
| 8,881,857 B2 | 11/2014 | Binggeli et al. | |
| 9,777,774 B2 * | 10/2017 | Biechele | B62J 99/00 |
| 2010/0096832 A1 * | 4/2010 | Pinarello | B62K 3/04 |
| | | | 280/281.1 |
| 2013/0241170 A1 * | 9/2013 | Talavasek | B62M 6/90 |
| | | | 280/279 |
| 2015/0158551 A1 * | 6/2015 | Ogawa | B62M 6/90 |
| | | | 180/207.3 |
| 2015/0367911 A1 * | 12/2015 | Chu | B62K 3/02 |
| | | | 180/206.2 |

FOREIGN PATENT DOCUMENTS

| | | | | |
|---|---|---|---|---|
| DE | 20 2011 000 601 U1 | | 12/2011 | |
| DE | 202013008186 U1 | * | 12/2014 | ............. B62K 19/04 |
| EP | 2 230 164 A1 | | 9/2010 | |
| EP | 2653371 A1 | * | 10/2013 | ............. B62M 6/90 |
| JP | H09-66876 A | | 3/1997 | |
| JP | H11-79064 A | | 3/1999 | |
| JP | 2000198478 A | * | 7/2000 | ............. B62M 6/55 |
| JP | 2000238675 A | * | 9/2000 | |
| JP | 2007-265855 A | | 10/2007 | |
| JP | 2014141166 A | * | 8/2014 | ............. B62M 6/90 |

OTHER PUBLICATIONS

Office Action for German Patent Application No. 10 2014 226 828.1, dated Dec. 9, 2015, 7 pages.

* cited by examiner

A – B

E – F

A - B

E - F

BICYCLE FRAME, ELECTRIC BICYCLE AND ENERGY ACCUMULATOR

CROSS-REFERENCE TO RELATED APPLICATION

This Application is a Section 371 National Stage Application of International Application No. PCT/EP2015/080996, filed 22 Dec. 2015 and published as WO 2016/102579 A1 on 30 Jun. 2016, in German, the contents of which are hereby incorporated by reference in their entirety.

FIELD

The present invention relates to a bicycle frame, to an electric bicycle according to an energy storage device for an electric bicycle.

BACKGROUND

Electric bicycles, for example Pedelecs or e-bikes, are popular as greatly loved, easy to handle, emission-free means of transport. Particularly suitable types of bicycle are available for different areas of use. These include, inter alia, bicycles that are optimised for leisure use or the way to work, by road or on easy terrain (for example city bikes or touring bikes) and the e-mountain bikes (e-MTB) developed for use on terrain and especially also mountain terrain in various designs. Electric bicycles provide the possibility of increasing the range of use and increasing the average travelling speed, without overstraining the rider.

Electric bicycles which have energy storage devices mounted on the bicycle frame, known as battery packs/accumulator packs, are known from the prior art. In this case, the battery packs can be inserted into the bicycle frame or encompass it in portions. Solutions that can be inserted into the bicycle frame lead to reduced rigidity in this region, so special structural reinforcements of the frame are necessary. Battery packs which encompass the bicycle frame in portions require a relatively large amount of installation space and can thus impair the handling and cause less agility. Furthermore, in both variants, the possibility of removing the battery pack is restricted; it can only be removed upwards, for example. From the point of view of visual aspects, current electric bicycles can also, in particular, not meet the demands of a lifestyle-focussed rider with sporty ambitions.

SUMMARY OF THE INVENTION

The object of the invention is therefore to provide a novel bicycle concept which reconciles electrically assisted mobility with the demands of sporty and lifestyle-oriented riders.

A bicycle frame according to the invention has at least one frame portion which is configured for the removable mounting of at least one separate energy storage device, called a battery pack below. According to the invention, the frame portion configured for the removable mounting of the energy storage device has an asymmetric cross section with respect to a frame centre plane. As a result, the cross section of the energy storage device can be complemented by the highly rigid cross section of the frame portion to form a total cross section satisfying the highest technical and visual demands. As a result, the installation space requirement is furthermore minimised, so the handling and agility are improved. It is furthermore particularly advantageous if the symmetric cross section allows lateral removal of the battery pack. Not least, the asymmetric design appears atypical and therefore attractively brand-focussed. The concept according to the invention therefore also satisfies the demands of a lifestyle-focussed rider with sporty ambitions.

According to a particularly preferred embodiment of the invention, the lower tube is configured to mount the energy storage device. For mounting the energy storage device, the frame portion may be provided approximately centrally with respect to the lower tube between the bottom bracket and steering head bearing. In one variant comprising a bottom bracket drive (for example a motor-gearing unit), the energy storage device may extend as far as into a region of the bottom bracket drive receptacle. The energy storage device in this embodiment may be arranged in a visually pleasing manner in the lower end region of the lower tube. As a result, a centre of gravity of the bicycle that is as low as possible is achieved overall with optimised riding behaviour.

It has proven to be particularly advantageous if the battery pack, at least in portions, has an asymmetric cross section with respect to an energy storage device centre plane. As a result, highly integrated interaction between the frame portion and energy storage device is achieved.

In one embodiment, the frame portion and battery pack define a substantially diagonal dividing plane. In this case, a large bearing surface is provided. The battery pack may advantageously be removed towards one side of the bicycle frame, i.e. laterally.

The cross section of the frame portion and the cross section of the battery pack may complement one another to form a substantially rectangular total cross section. The cross section may preferably be cuboid or square. As a result, the installation space requirement is reduced to a minimum.

In a preferred bicycle frame, the battery pack is arranged above the frame portion. As a result, the battery pack can easily be inserted from above and locked in the frame by the user. In other words, the battery pack is preferably placed on the frame portion from above. This arrangement furthermore achieves the best possible protection of the battery pack against damage, for example due to the impact of a stone or touching the ground.

According to a first variant according to the invention of the bicycle frame, the frame portion has an approximately L-shaped cross section, at least in portions. An extremely compact, homogenous frame shape is achieved in this case, which elegantly fulfils the strength requirements.

Here, the battery pack is preferably arranged in a protected manner above the frame portion. The battery pack can complement the frame portion in a compact and elegant manner. The frame portion and the energy storage device define a substantially diagonal dividing plane, which extends from the bottom left to the top right of the cross section in one embodiment. Particularly preferably, the energy storage device and frame portion complement one another to form a rectangular cross section. The cross section may be square here.

It is correspondingly advantageous if the battery pack also has an L-shaped cross section, at least in portions. The battery pack may have at least one rounded corner region. In a preferred embodiment, all the corner regions are rounded.

In a second variant of the bicycle frame according to the invention, the frame portion is provided with a stepped cross section, at least in portions. The battery pack in this variant is preferably also L-shaped, at least in portions. The dividing plane is stepped in this embodiment. A compact, homogenous frame shape is also achieved in this variant. The frame portion has, in particular, a single step.

The battery pack may be dimensioned in such a way that it terminates approximately flush with the frame upper side of the lower tube in the region of the frame portion. The frame portion and the battery pack define a substantially diagonal dividing plane, which extends in a step shape from the bottom left to the top right of the cross section. The battery pack and frame portion particularly preferably complement one another to form a rectangular cross section. The cross section may be square in this case.

In a third variant of the bicycle frame according to the invention, the frame portion is configured having a polygonal cross section, at least in portions. The frame portion preferably has a bearing surface enclosing an obtuse bearing angle for the battery pack.

In a particularly preferred embodiment, the frame portion has an approximately triangular cross section having two bearing surfaces enclosing a bearing angle for the battery pack. The bearing surfaces form, in particular, a V-shaped saddle arranged approximately centrally, the apex of which projects outwards from the triangular base surface. This provides a centred battery pack mounting with high strength. A compact, homogenous frame shape is also achieved in this variant.

In a fourth variant, the frame portion of a bicycle frame has a diagonally inclined, approximately W-shaped frame support surface for an also approximately W-shaped energy storage device support surface.

The frame support surface may consist of an approximately horizontal support surface and an approximately vertical support surface which are connected by two outwardly inclined saddle surfaces, which define a central vertex. The battery pack preferably has a corresponding vertical angle.

In this case, the frame portion may have a faceted lower side having a horizontal outer surface and a vertical outer surface which are connected by an oblique outer surface. The frame portion and battery pack may have rounded corner regions.

According to a fifth variant of the bicycle frame according to the invention, the frame portion has a triangular cross section, at least in portions. The frame portion and the battery pack preferably define a substantially diagonal dividing plane in this case, which may extend from the bottom left to the top right of the cross section. The energy storage device and frame portion complement one another to form a quadrilateral.

The energy storage device and frame portion particular preferably complement one another to form a rectangular cross section. The cross section may be square in this case. The energy storage device projects upwards beyond the frame upper side of the lower tube in the region of the frame portion.

It has proven to be advantageous in this variant if the battery pack has a triangular cross section, at least in portions. The longer triangle side can serve as a contact surface. Overall, in this variant, a compact, homogenous frame shape with the greatest strength is achieved.

An electric bicycle according to the invention has a bicycle frame having at least one frame portion which is configured for the removable mounting of at least one separate energy storage device, in particular a battery pack. According to the invention, the frame portion configured for the removable mounting of the energy storage device has an asymmetric cross section with respect to a frame centre plane. The electric bicycle thus has an optimised frame cross section with the best structural and aesthetical properties with minimal installation space requirements.

An energy storage device according to the invention, in particular a battery pack, has a battery housing for insertion into the frame portion, which is configured for this, of the bicycle frame. According to the invention, the energy storage device has an asymmetric cross section with respect to an energy storage device centre plane or a housing centre plane of the housing. The battery housing has at least one fastening mechanism, such as, by way of example, latching means, and/or at least one recess for a fastening mechanism.

The battery pack proposed by the invention has a battery housing, in particular made of plastics material and with a moisture-proof structure, which is configured for secure attachment in the proposed bicycle frame, in other words fastening means suitable for this or openings for the engagement of fastening means provided on the frame. To facilitate recharging or exchange, the fastening means are preferably latching means, such as snap or locking closures, but, alternatively, easy-to-handle screw connections etc. may also be used.

According to a preferred embodiment, a set of energy storage devices can be inserted, for example as battery packs with different storage capacities, into the bicycle frame. The battery packs may, despite different storage capacities, have connection dimensions insertable into the frame. As a result, the battery packs can easily be inserted into the bicycle frame and can be fixed there.

The invention can be universally implemented in all type of bicycles, in particular in mountain bikes (both in a hard tail or full suspension mode of construction), but also in other bicycles, for example a road bike frame, and can therefore ultimately produce a touring, city or cross bike or other modern bicycle types. Because of the compact, elegant mode of construction, it allows the building of bikes which largely combine the advantages of a traditional bicycle and an electric bicycle.

Since, from the outside, the bicycle according to the invention is barely any different from other modern and sportily designed bikes, the design satisfies the sporty and lifestyle demand of wide user groups. The possible discreet integration of the electric drive concept is elegant.

The dependent claims relate to further preferred embodiments.

BRIEF DESCRIPTION OF DRAWINGS

Preferred embodiments of the present invention will be described in more detail below with reference to the accompanying drawings, in which, in detail:

FIG. 1b is the second side view of the bicycle frame from FIG. 1a,

FIG. 2a is a sectional view along the line C-D from FIG. 1a,

FIG. 2b is a sectional view along the line A-B from FIG. 1a,

FIG. 2c is a sectional view along the line E-F from FIG. 1a,

FIG. 9b is the second side view of the bicycle frame from FIG. 9a, FIG. 10a is a sectional view along the line C-D from FIG. 9a, FIG. 10b is a sectional view along the line A-B from FIG. 9a and FIG. 10c is a sectional view along the line E-F from FIG. 9a.

DETAILED DESCRIPTION OF THE EMBODIMENTS

Figure 1A:
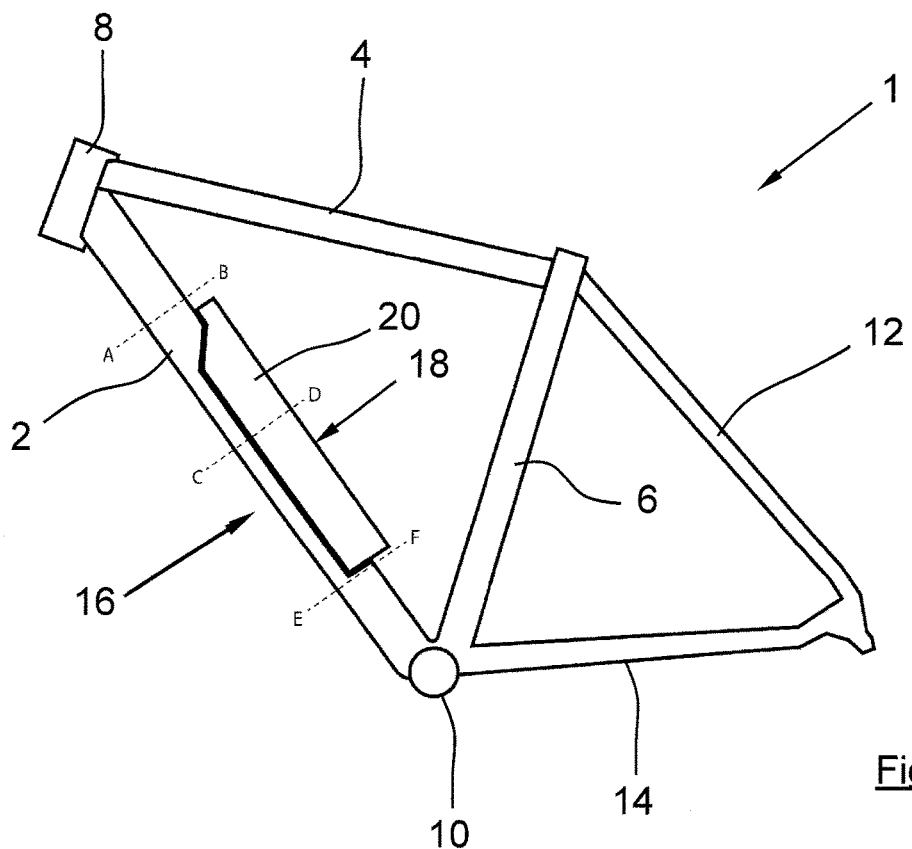
FIG. 1a is a side view of a bicycle frame according to the invention.

FIG. 1a shows a side view of a bicycle frame 1 according to the invention configured by way of example as a diamond frame, having a lower tube 2, an upper tube 4, a saddle tube 6, a headtube 8, a bottom bracket housing 10 as well as saddle struts 12 and lower struts 14.

The bicycle frame 1 according to the invention has a frame portion 16 which is configured for the removable mounting of a separate energy storage device configured as a battery pack 18 having a battery housing 20. The frame portion 16 for mounting the battery pack 18 is provided slightly below the centre of the lower tube 2 between the bottom bracket housing 10 and headtube 8. The battery pack 18 is arranged above the frame portion 16. As a result, the battery pack 18 can easily be inserted from above and locked in the frame 1 by the user. In other words, the battery pack 18 is placed on the frame portion 16 from above. With this arrangement, the best possible protection of the battery pack 18 against damage, for example by the impact of a stone or touching the ground is achieved. The frame portion 16 has an end region running in an inclined manner. This inclined end region is preferably provided in the upper tube region. The incline is selected in such a way that it extends substantially vertically.

Figure 1B:
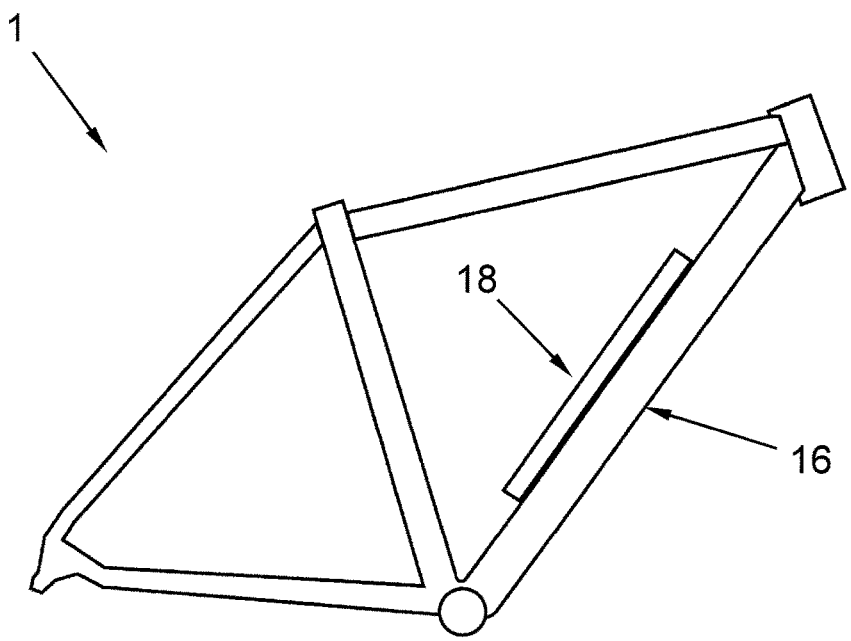

FIG. 1b is the second side view of the bicycle frame 1 from FIG. 1a. According to FIGS. 1a and 1b, the battery pack 18 projects upwards beyond the frame upper side of the lower tube 2 in the region of the frame portion 16.

Figure 2A:
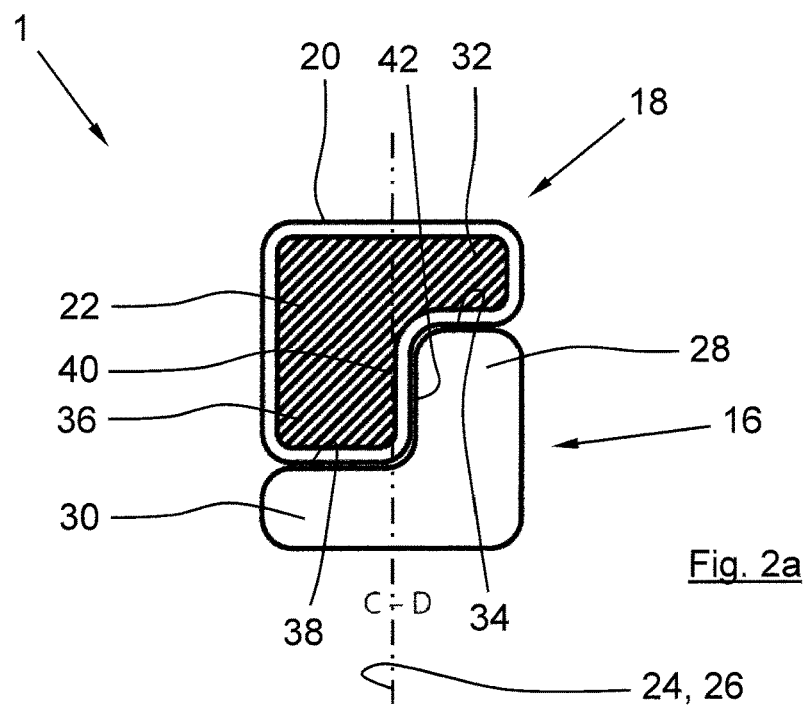

As can be inferred in particular from FIG. 2a, which shows a sectional view along the line C-D from FIG. 1a, the frame portion 16 of the bicycle frame 1 configured for the removable mounting of the battery pack 18 has an asymmetric cross section with respect to a frame centre plane 24. The battery pack 18 having the battery housing 20 and internal, schematically shown battery cells 22 has an asymmetric cross section with respect to an energy storage device centre plane 26, the frame centre plane 24 and the energy storage device centre plane 26 being arranged in a common plane. As a result, the cross section of the battery pack 18 can be complemented by the highly rigid cross section of the frame portion 16 to form a total cross section satisfying the highest technical and visual demands. The installation space requirement is minimised, so the handling and agility are improved. Furthermore, optimised interaction between the frame portion 16 and battery pack 18 is achieved. The battery pack 18 can optionally be removed or inserted upwards or to one side of the bicycle frame, i.e. laterally. As a result, improved handling of the battery pack 18 is made possible.

According to this first variant according to the invention of the bicycle frame 1, the frame portion 16 has an approximately L-shaped cross section. In this case, a vertical leg 28 of the frame portion 16 is arranged at a right angle to a horizontal leg 30. The legs 28, 30 have a substantially rectangular basic shape with rounded corner regions. Correspondingly, the battery pack 18 also has an approximately L-shaped cross section with rounded corner regions.

An upper contact surface 32 of the battery pack 18 rests on an upper bearing surface 34 of the frame portion 16. A lower contact surface 36 of the battery pack 18 rests on a lower bearing surface 38 of the frame portion 16. The lower bearing surface 38 of the frame portion 16 is wider than the upper bearing surface 34. The lower bearing surface 38 of the frame portion 16 is arranged on the left in the figure. The upper contact surface 32 of the battery pack 18 is connected by a side wall 40 to the lower contact surface 36, the side wall 40 extending at a right angle to the contact surfaces 32, 36.

The upper bearing surface 34 of the frame portion 16 is connected by a side wall 42 to the lower bearing surface 38, the side wall 42 extending at a right angle to the bearing surfaces 34, 38.

The frame portion 16 and the battery pack 18 thus define a substantially stepped, diagonal dividing plane, which extends from the bottom left to the top right of the cross section. The battery pack 18 and frame portion 16 complement one another to form a rectangular total cross section. In this case, the cross section is square or almost square.

An extremely compact, homogenous frame shape is achieved here, which elegantly fulfils the strength requirements.

Figure 2B:
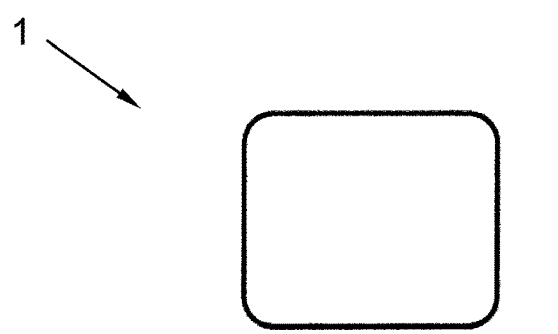
Figure 2C:
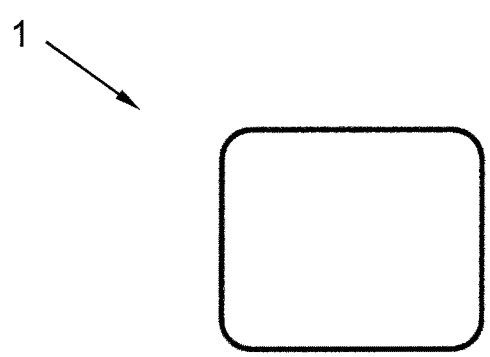

As shown by FIGS. 2b and 2c, which relate to sectional views along the line A-B and along the line E-F from FIG. 1a, respectively, the frame, above and below the frame portion 16, has a substantially rectangular cross section. The external dimensions of the cross section approximately correspond to the external dimensions of the frame portion 16.

Figure 3A:
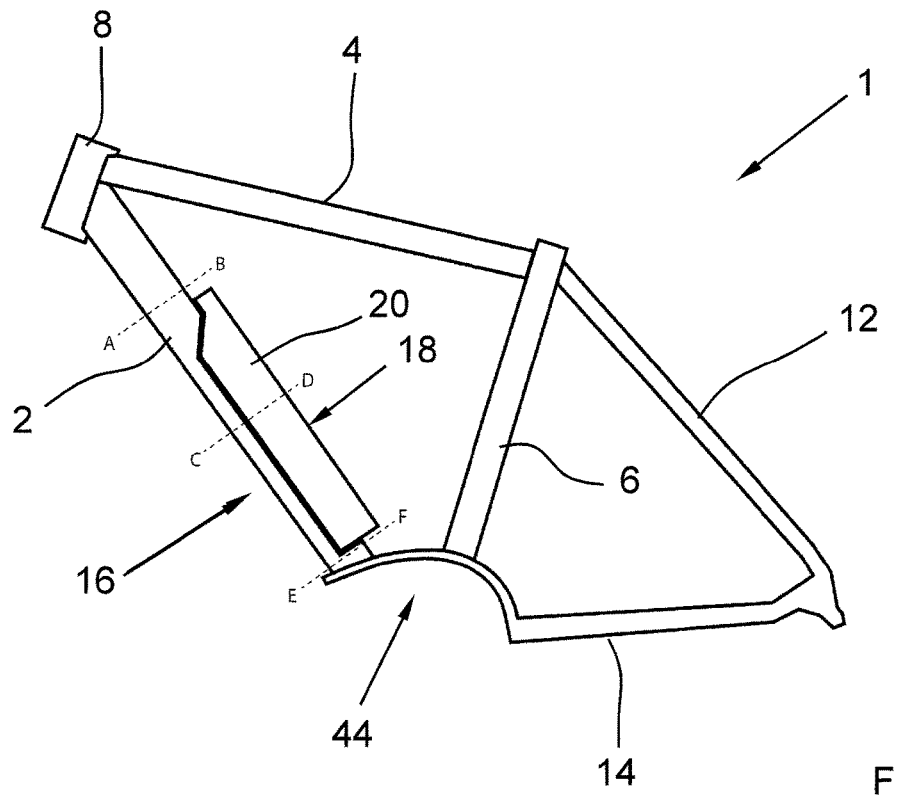
FIG. 3a is a side view of a bicycle frame having a bottom bracket motor receptacle.
Figure 3B:
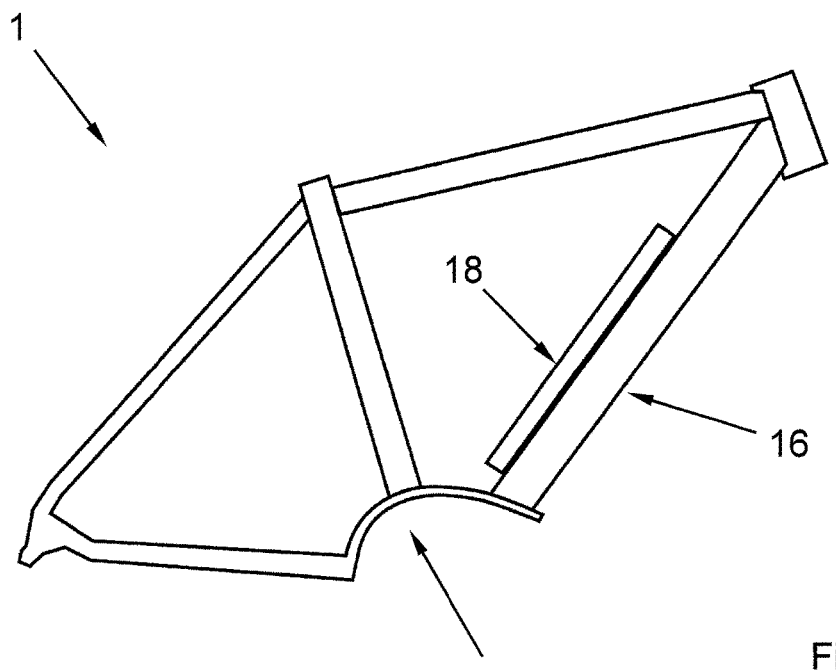
FIG. 3b is the second side view of the bicycle frame from FIG. 3a, FIG. 4a is a side view of a bicycle frame according to a further embodiment according to the invention.

FIGS. 3a and 3b show side views of a variant according to the invention having a concave bottom bracket drive receptacle 44 for a bottom bracket drive (not shown), for example a motor-gearing unit. The battery pack 18 extends in this case as far as into a region of the bottom bracket drive receptacle 44. In this embodiment, the battery pack 18 is arranged in the lower end region of the lower tube in a manner that is visually attractive and optimised for a low overall centre of gravity. The cross sections of the bicycle frame correspond to the cross sections according to FIG. 2a to 2c.

Figure 4A:
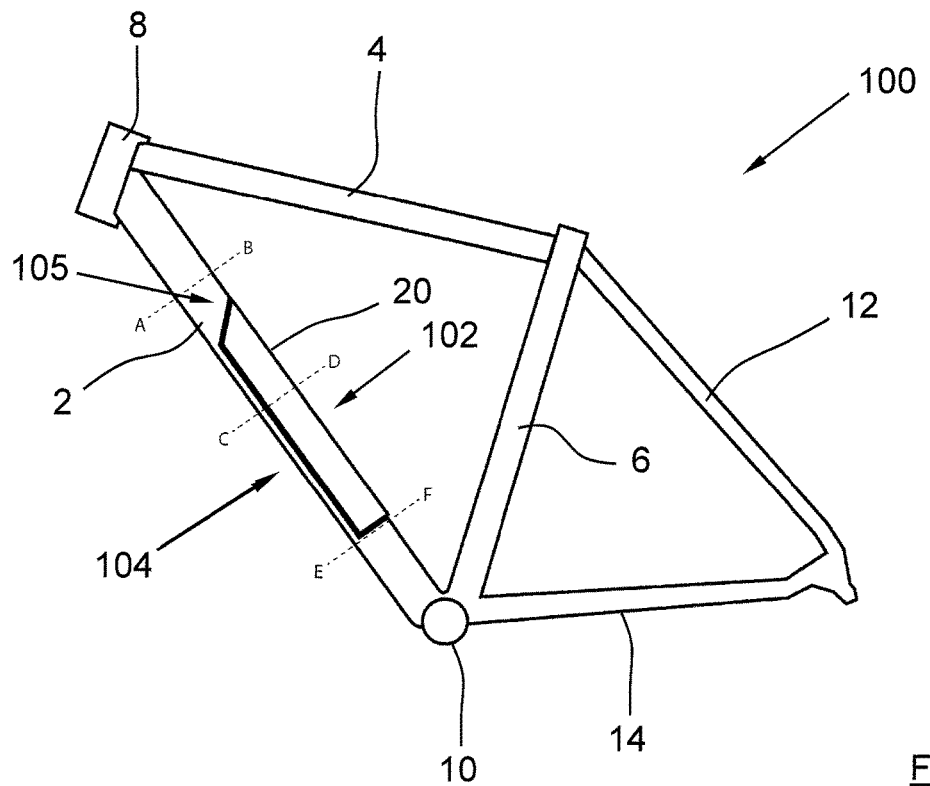
FIG. 4b is the second side view of the bicycle frame from FIG. 4a, FIG. 5a is a sectional view along the line C-D from FIG. 4a, FIG. 5b is a sectional view along the line A-B from FIG. 4a, FIG. 5c is a sectional view along the line E-F from FIG. 4a, FIG. 6a is a side view of a bicycle frame having a bottom bracket motor receptacle according to a further embodiment.
Figure 4B:
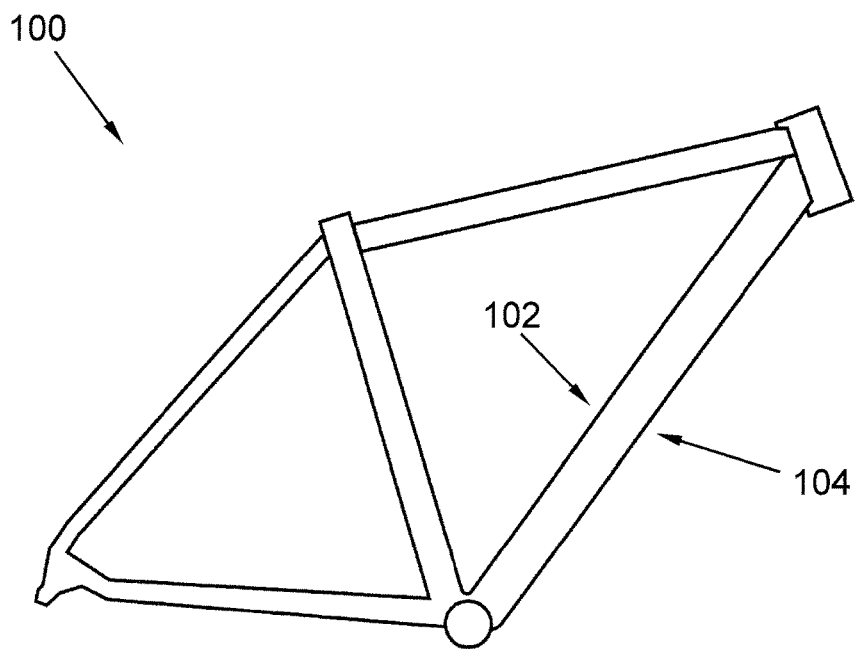

In a further variant according to FIGS. 4a and 4b of a bicycle frame 100 according to the invention, a frame portion 104 is provided to receive a battery pack 102. The battery pack 102 is received flush in the frame portion 104. The frame portion 104 has an end region 105 running in an inclined manner. This inclined end region 105 is preferably provided in the upper tube region. The incline is selected in such a way that it extends substantially vertically.

Figure 5A:
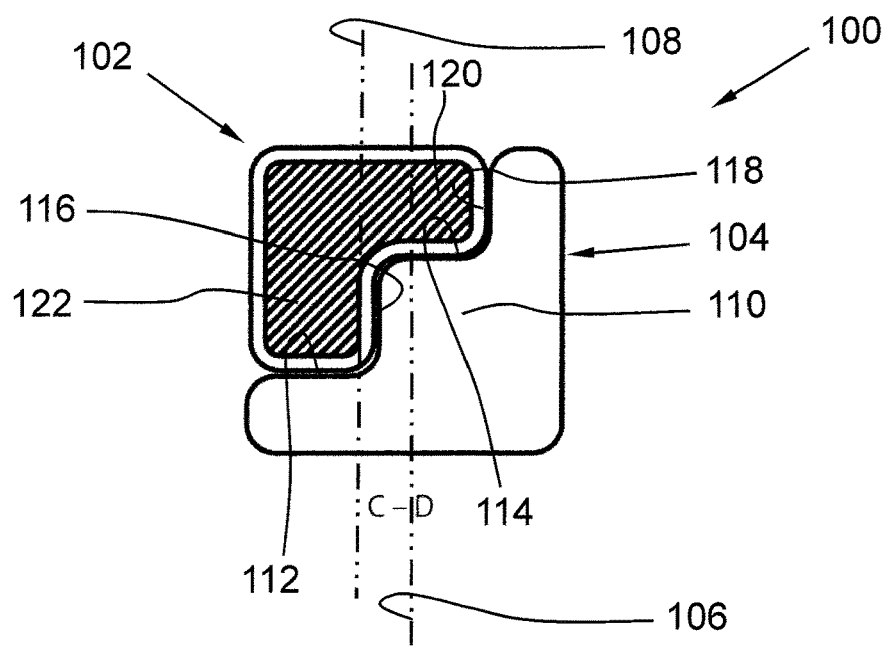

As can be inferred from FIG. 5a, which shows a sectional view along the line C-D from FIG. 4a, the frame portion 104 of the bicycle frame 100 configured for the removable mounting of the battery pack 102 has an asymmetric cross section with respect to a vertical frame centre plane 106.

The battery pack 102 has an asymmetric cross section with respect to an energy storage device centre plane 108, the frame centre plane 106 being arranged in a manner offset to the right from the energy storage device centre plane 108. The battery pack 102 is also L-shaped, at least in portions, in this variant. The frame portion 104 is provided with a stepped cross section. The dividing plane is diagonal and stepped in this embodiment.

The frame portion 104 has a step 110 having a first bearing surface 112, which is horizontal in the figure, and a second bearing surface 114, which is horizontal in the figure, as well as a first wall surface 116, which is vertical in the figure, and a second wall surface 118, which is vertical in the figure. The bearing surfaces 112, 114 are arranged at right angles to the wall surfaces 116, 118. The battery pack 102 has a horizontal first leg 120 and a vertical second leg 122 extending at a right angle thereto. The legs 120, 122 are approximately of the same length. The second leg 122 is wider than the first leg 120.

The frame portion 104 and the battery pack 102 define a substantially diagonal dividing plane, which extends from the bottom left to the top right of the cross section. The battery pack 102 terminates approximately flush with the frame upper side of the lower tube in the region of the frame portion 104. The frame portion 104 and battery pack 102 have rounded corner regions. The battery pack 102 and frame portion 104 complement one another to form a rectangular cross section. The cross section may be square in this case. In this variant, a compact, homogenous frame shape is also achieved. The battery pack 102 can optionally be removed or inserted upwards or to one side of the bicycle frame. This allows improved handling.

Figure 5B:
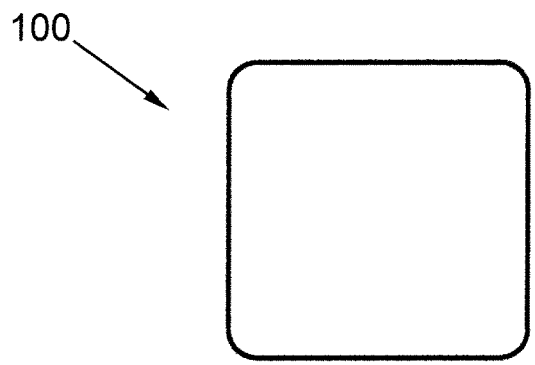
Figure 5C:
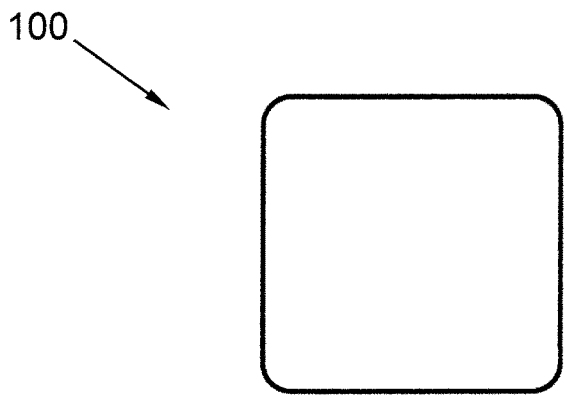

As shown by FIGS. 5b and 5c, which relate to a sectional view along the line A-B and along the line E-F from FIG. 4a, respectively, the frame 100, above and below the frame portion, has a substantially square cross section of the same height and width. The external dimensions of the cross section approximately correspond to the external dimensions of the frame portion 104.

Figure 6A:
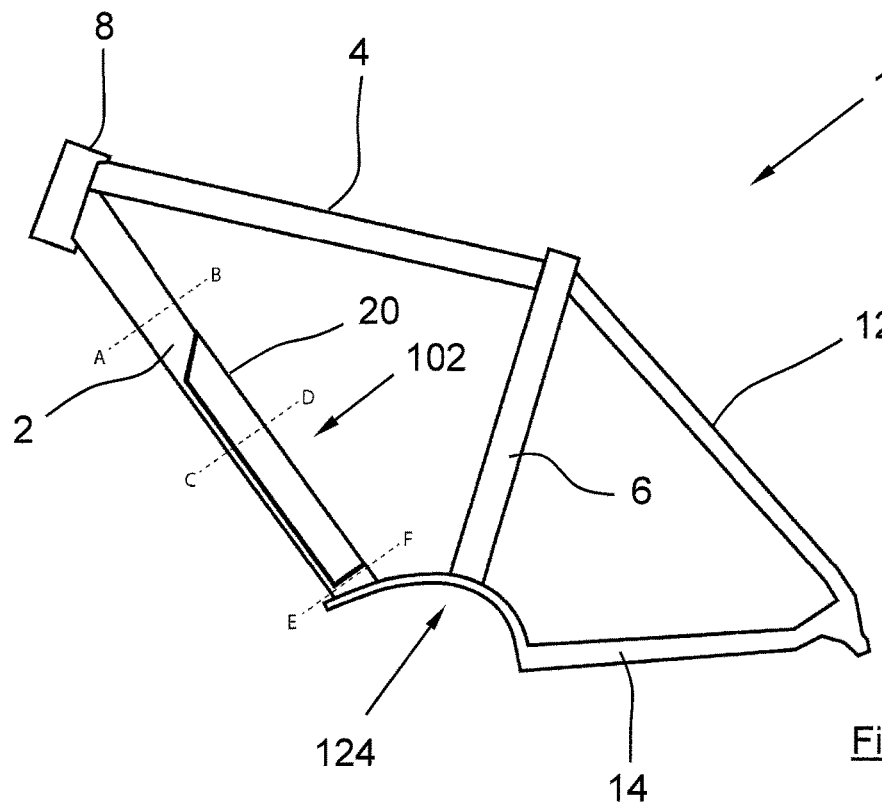
FIG. 6b is the second side view of the bicycle frame from FIG. 6a, FIG. 7a is an alternative sectional view along the line C-D from FIG. 1a, FIG. 7b is an alternative sectional view along the line A-B from FIG. 1a, FIG. 7c is an alternative sectional view along the line E-F from FIG. 1a, FIG. 8a is an alternative sectional view along the line C-D from FIG. 4a, FIG. 8b is an alternative sectional view along the line A-B from FIG. 4a, FIG. 8c is an alternative sectional view along the line E-F from FIG. 4a, FIG. 9a is a side view of a bicycle frame according to the invention.
Figure 6B:
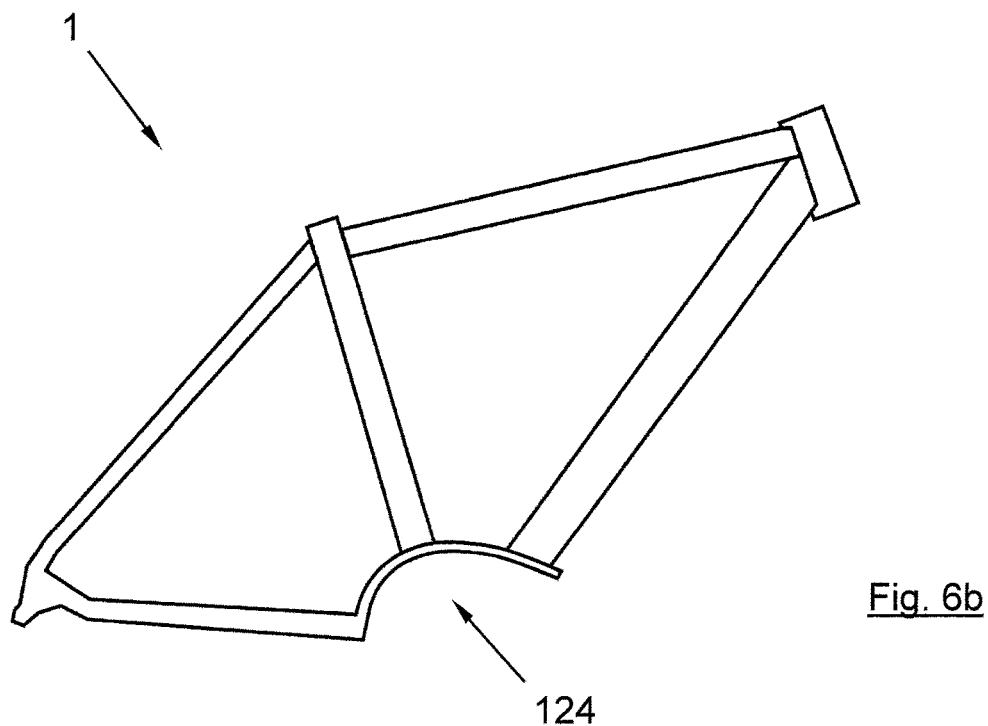

FIGS. 6a and 6b show side views of a variant having a concave bottom bracket drive receptacle 124 for a bottom bracket drive (not shown) for example a motor-gearing unit. In this case, the battery pack 102 extends as far as into a region of the bottom bracket drive receptacle 124. In this embodiment, the battery pack 102 is arranged in the lower end region of the lower tube in a manner that is visually attractive and optimised for a low overall centre of gravity. The cross sections of the bicycle frame may correspond to the cross sections according to FIG. 5a to 5c.

Figure 7A:
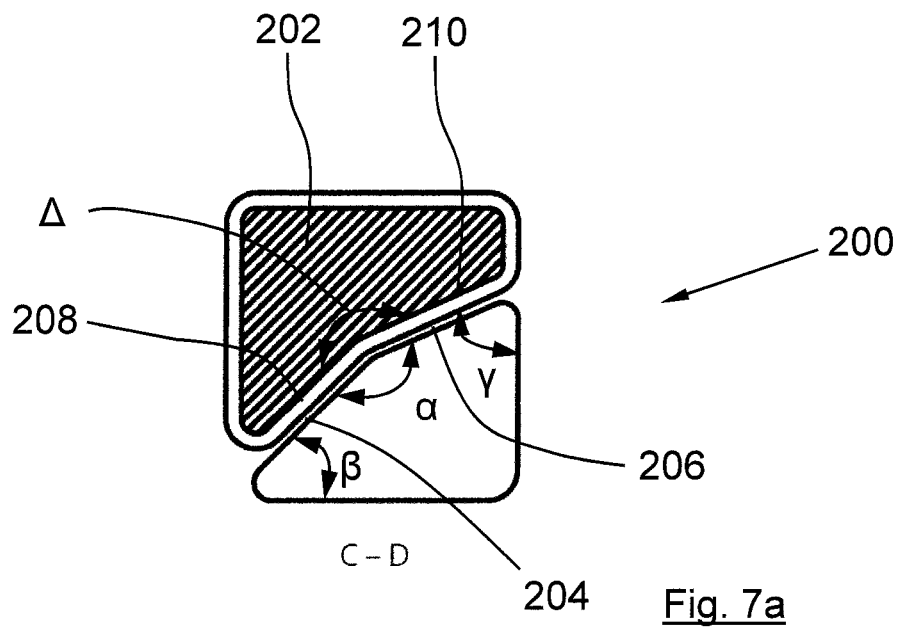

In an alternative variant of a bicycle frame according to the invention according to FIGS. 1a and 1b, a frame portion 200 is configured to receive a battery pack 202 having a polygonal cross section, as can be inferred from FIG. 7a. The frame portion 200 has a roughly approximately triangular cross section having two bearing surfaces 204, 206 enclosing a bearing angle α for the battery pack 202. The bearing surfaces 204, 206 form a V-shaped saddle arranged approximately centrally, the apex of which projects outwards from the triangular base surface. The size of the bearing angle α is preferably in the range from about 120° to 170°. In the particularly advantageous embodiment shown, the bearing angle α is about 160°. A first frame portion angle β is in the range from about 30° to 70°. In the particularly advantageous embodiment shown, the frame portion angle β is about 45°. A second frame portion angle γ is in the range from about 30° to 80°. In the particularly advantageous embodiment shown, the frame portion angle γ is about 65°.

The battery pack 202 correspondingly has two contact surfaces 208, 210 enclosing a contact angle A towards the frame portion. The contact surfaces 208, 210 form a concave deep point, which is arranged approximately centrally and the apex of which projects inwards. The angle ranges are adapted to the frame portion angles. The frame portion 200 and the battery pack 202 therefore define a substantially diagonal dividing plane, which extends from the bottom left to the top right of the cross section.

The battery pack 202 is arranged above the frame portion 200 and rests thereon. The battery pack 202 complements the frame portion 200 to form a compact, rectangular cross section. The battery pack 202 can optionally be removed or inserted upwards or to one side of the bicycle frame.

Figure 7B:
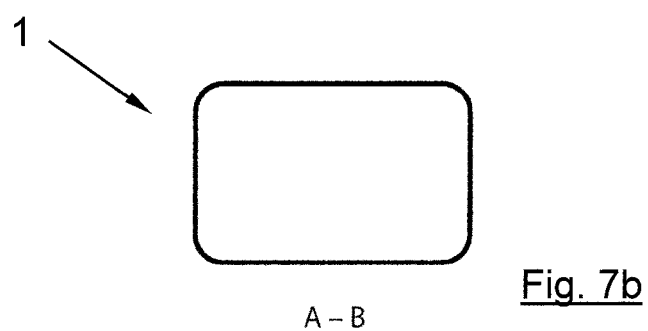
Figure 7C:
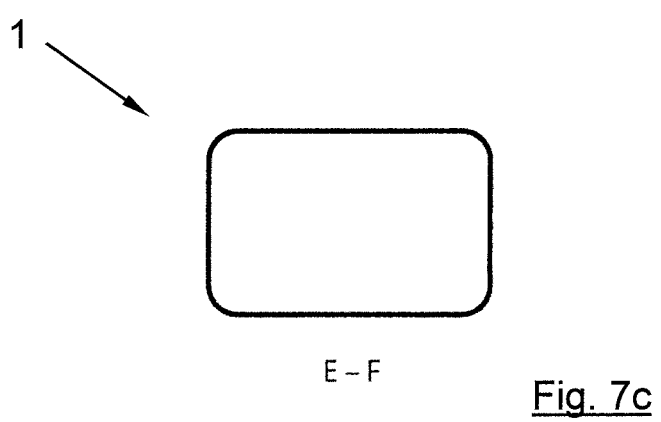

As shown by FIGS. 7b and 7c, which relate to an alternative sectional view along the line A-B or along the line E-F from FIG. 1a, respectively, in this variant the frame, above and below the frame portion 200, has a substantially rectangular cross section. The width of the frame is greater than its height in this case.

Similarly to FIG. 3a, 3b, the bicycle frame may also be provided with a concave bottom bracket drive receptacle in this cross-sectional variant. The cross sections of the bicycle frame correspond to the cross sections according to FIG. 7a to 7c.

Figure 8A:
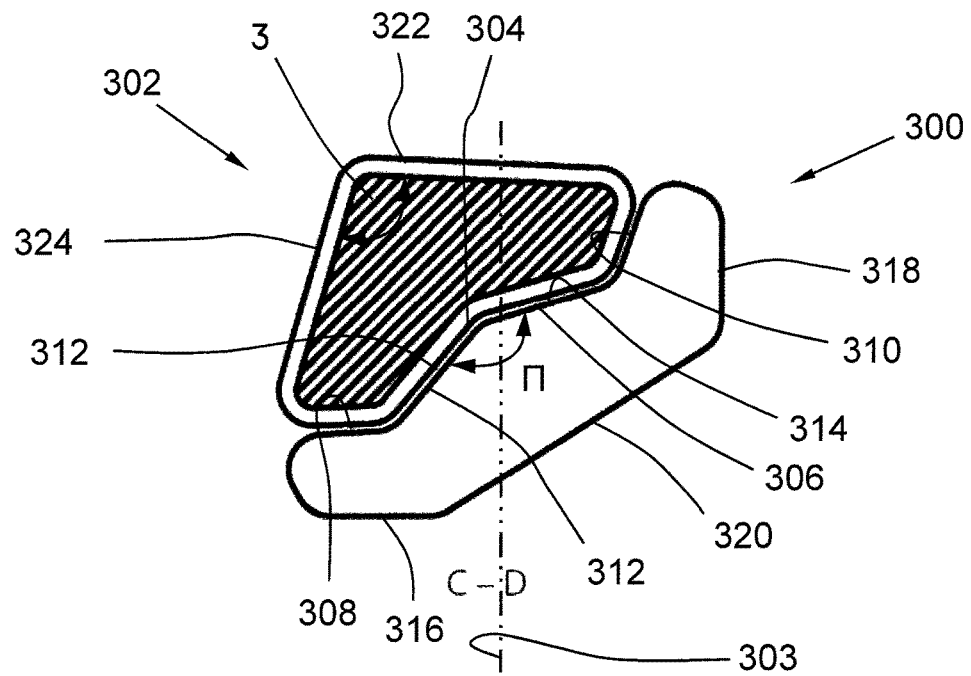

In a further alternative variant of a bicycle frame according to the invention according to FIGS. 4a and 4b, a frame portion 300 for receiving a battery pack 302 is configured having an approximately W-shaped cross section, as can be inferred from FIG. 8a. The frame portion 300, which is asymmetric with respect to its frame centre plane 303, has a diagonally inclined, approximately W-shaped frame support surface 304 for an also approximately W-shaped energy storage device support surface 306.

The frame support surface 304 consists of an approximately horizontal support surface 308 and an approximately vertical support surface 310, which are connected by two outwardly inclined saddle surfaces 312, 314, which define a central vertex. The vertical angle π is in the range from about 90° to 170°, preferably about 150°. The battery pack 302 has a corresponding vertical angle.

The frame portion 300 has a faceted lower side having a first outer surface 316, which is horizontal in the figure, and an outer surface 318, which is approximately vertical in the figure, which are connected by an oblique outer surface 320. The oblique outer surface 320 extends from the bottom left to the top right with respect to the frame cross section. It has an angle of inclination of about 10° to 70°, preferably 30°.

The battery pack 302 has an upper outer surface 322 and a lateral outer surface 324, which enclose an angle 3 of about 60 to 140°, preferably of about 100°. This also makes it possible to remove the battery pack 320 laterally. The frame portion 300 and battery pack 320 have rounded corner regions. The battery pack 302, in the region of the frame portion, terminates approximately flush with the frame upper side of the lower tube.

Figure 8B:
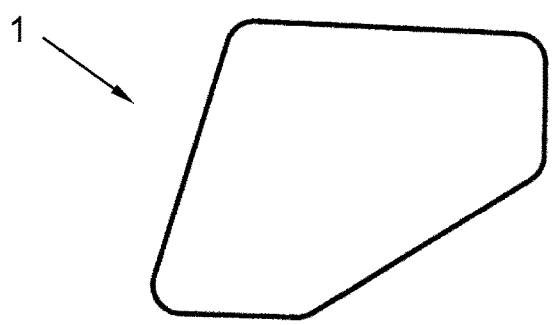
Figure 8C:
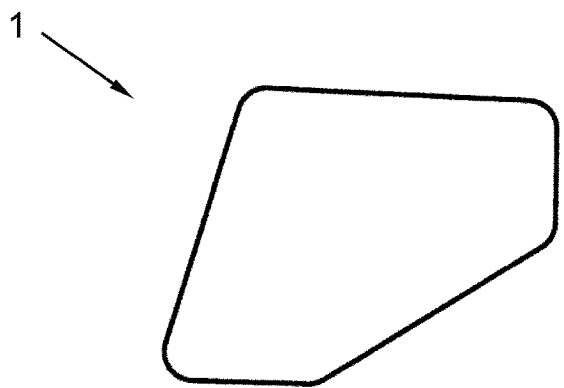

As shown by FIGS. 8b and 8c, which relate to an alternative sectional view along the line A-B and along the line E-F from FIG. 4a, respectively, the frame, above and below the frame portion, has a cross section and dimensions corresponding to the total cross section according to FIG. 8a.

Similarly to FIG. 6a, 6b, the bicycle frame may also be provided with a concave bottom bracket drive receptacle in this cross-sectional variant. The cross sections of the bicycle frame correspond to the cross sections according to FIG. 8a to 8c.

Figure 9A:
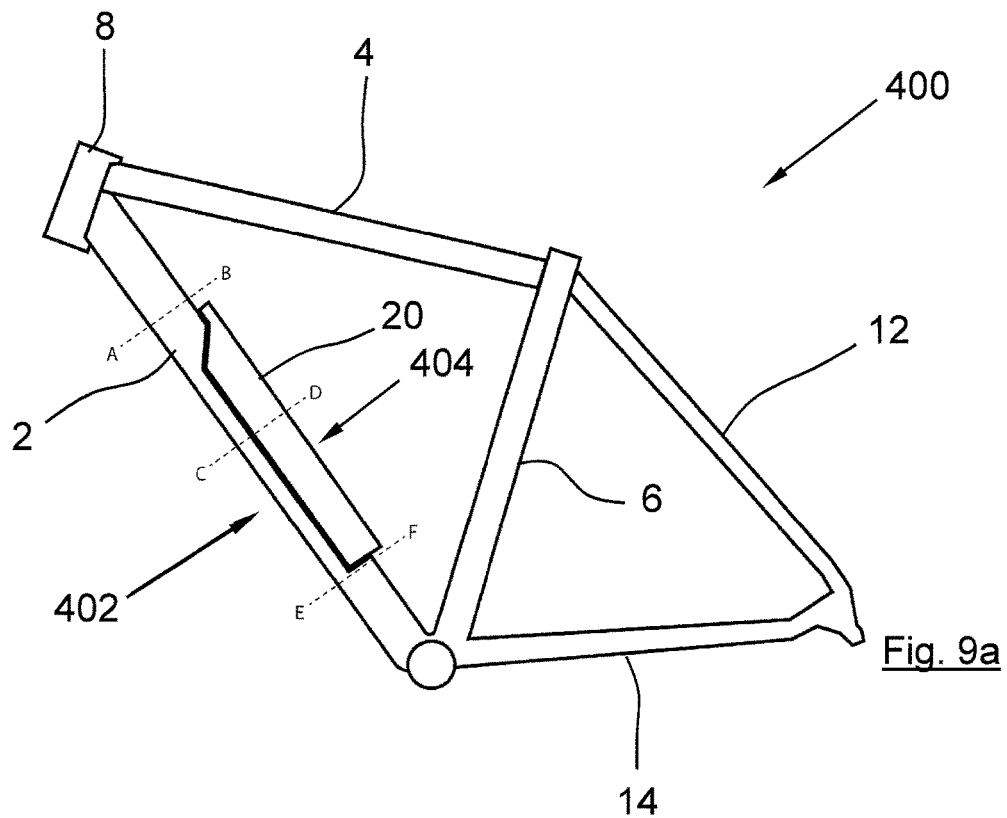
Figure 9B:
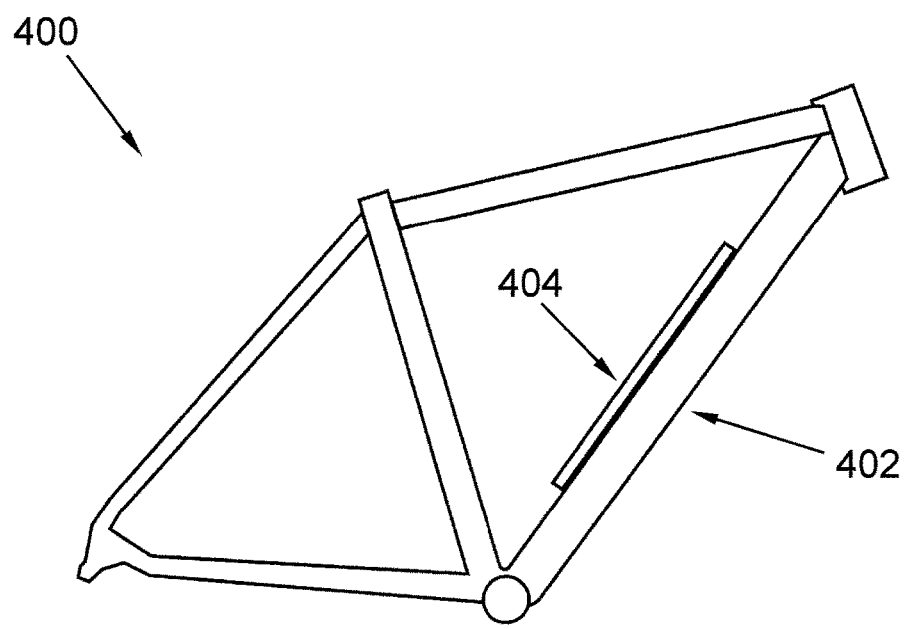
Figure 10A:
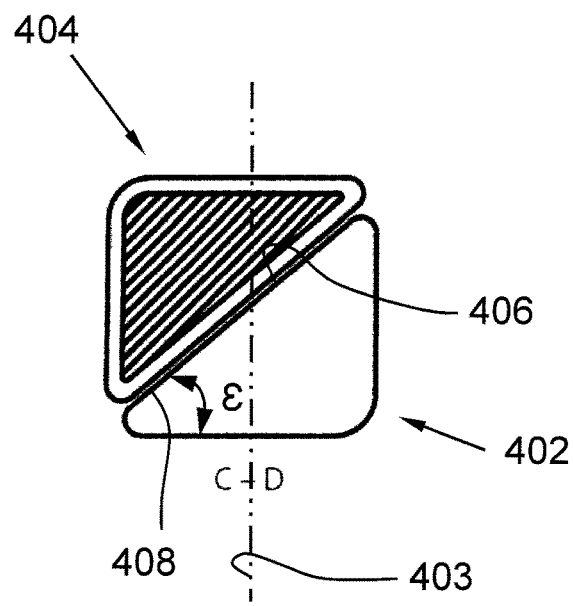
Figure 10B:
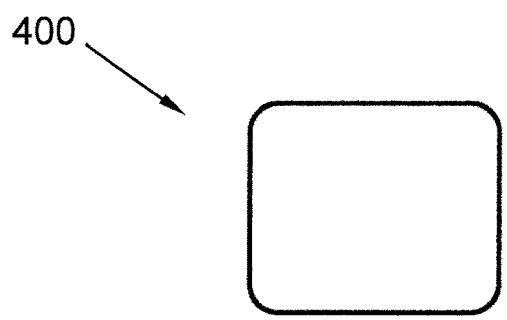
Figure 10C:
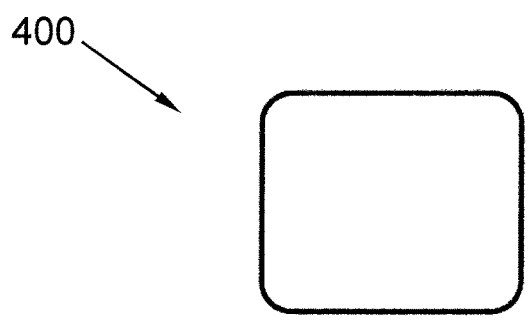

A last variant of a particularly preferred bicycle frame 400 according to the invention is shown in FIGS. 9a and 9b. As can be inferred from FIG. 10a, which shows a cross-sectional view along the line C-D from FIG. 9a, the frame portion 402, with respect to its frame centre plane 403, has an asymmetric, approximately triangular cross section in the shape of a right-angled triangle.

In this case, the frame portion 402 and the battery pack 404 define a diagonal dividing plane 406, which extends from the bottom left to the top right of the cross section. The longer triangle side is used as a bearing surface 408. The bearing surface 408 has an angle of inclination 8 in the range from about 20° to 70°, preferably about 40°. In this case, the battery pack 404 and frame portion 402 complement one another to form an approximate square. Overall, a compact, homogenous frame shape with the greatest strength is also achieved in this variant. The battery pack 404 projects slightly upwards beyond the frame upper side of the lower tube in the region of the frame portion 402.

The battery pack 404 rests from above on the frame portion 402 and has a corresponding triangular cross section in the shape of a right-angled triangle. The longer triangle side is used as a contact surface. The contact surface has an angle of inclination corresponding to the frame portion in the range from about 20° to 70°, preferably about 40°. In this case, the battery pack 404 can optionally be removed upwards or to one side of the bicycle frame, so ergonomic handling is made possible.

The embodiment of the invention is not limited to the examples shown in the figures and described above, but is also possible in a large number of modifications by a person skilled in the art.

A bicycle frame is disclosed, having at least one frame portion which is configured for the removable mounting of at least one separate energy storage device, in particular a battery pack. According to the invention, the frame portion configured for the removable mounting of the energy storage device has an asymmetric cross section with respect to a frame centre plane. An electric bicycle according to the invention has a frame portion which is configured for the removable mounting of at least one separate energy storage device, the frame portion having an asymmetric cross section with respect to a frame centre plane.

Furthermore, an energy storage device is disclosed, having an asymmetric cross section with respect to an energy storage device centre plane.

LIST OF REFERENCE NUMERALS 1 bicycle frame
2 lower tube
4 upper tube
6 saddle tube
8 headtube
10 bottom bracket housing
12 saddle strut
14 lower strut
16 frame portion
18 battery pack
20 battery housing
22 battery cells
24 frame centre plane
26 energy storage device centre plane
28 vertical leg
30 horizontal leg
32 contact surface
34 bearing surface
36 contact surface
38 bearing surface
40 side wall
42 side wall
44 bottom bracket drive receptacle
100 bicycle frame
102 battery pack
104 frame portion
105 end region
106 frame centre plane
108 energy storage device centre plane
110 step
112 first bearing surface
114 second bearing surface
116 first wall surface
118 second wall surface
120 first leg
122 second leg
124 bottom bracket drive receptacle
200 frame portion
202 battery pack
204 bearing surface
206 bearing surface
208 contact surface
210 contact surface
300 frame portion
302 battery pack
303 frame centre plane
304 frame support surface
306 energy storage device support surface
308 support surface
310 support surface
312 saddle surface
314 saddle surfaces
316 outer surface
318 outer surface
320 oblique outer surface
322 outer surface
324 outer surface
400 bicycle frame
402 frame portion
403 frame centre plane
404 battery pack
406 dividing plane

The invention claimed is:

1. A Bicycle frame having at least one frame portion which is configured for the removable mounting of at least one separate energy storage device, characterized in that the frame portion configured for the removable mounting of the energy storage device has an asymmetric cross section with respect to a frame centre plane, wherein the frame portion has an L-shaped cross section at least along portions of the frame portion, which extend in a direction perpendicular to said L-shaped cross section, and wherein the cross section of the frame portion and the cross section of the energy storage device complement one another to form a substantially rectangular total cross section.

2. The bicycle frame according to claim 1, wherein the lower tube is configured for mounting the energy storage device.

3. The bicycle frame according to claim 1, wherein the energy storage device, at least in portions, has an asymmetric cross section with respect to an energy storage device centre plane.

4. The bicycle frame according to claim 1, wherein the frame portion and energy storage device define a substantially diagonal dividing plane.

5. The bicycle frame according to claim 1, wherein the energy storage device is arranged above the frame portion.

6. The bicycle frame according to claim 1, wherein the energy storage device has an L-shaped cross section, at least in portions.

7. The bicycle frame according to claim 1, wherein the frame portion has a stepped cross section, at least in portions.

8. The bicycle frame according to claim 1, wherein the frame portion has a polygonal cross section, at least in portions.

9. The bicycle frame according to claim 1, wherein the frame portion has a bearing surface which encloses a bearing angle ($\alpha$, $\pi$) and is approximately V-shaped or W-shaped, for the energy storage device.

10. The bicycle frame according to claim 1, wherein the frame portion has a triangular cross section, at least in portions.

11. The bicycle frame according to claim 1, wherein the energy storage device has a triangular cross section, at least in portions.

12. An electric bicycle comprising a bicycle frame having at least one frame portion which is configured for the removable mounting of at least one separate energy storage device, characterized in that the frame portion configured for the removable mounting of the energy storage device has an asymmetric cross section with respect to a frame centre plane, wherein the frame portion has an L-shaped cross section, at least along portions of the frame portion, which extend in a direction perpendicular to said L-shaped cross section, and wherein the cross section of the frame portion and the cross section of the energy storage device complement one another to form a substantially rectangular total cross section.

13. An energy storage device, for an electric bicycle comprising a bicycle frame having at least one frame portion which is configured for the removable mounting of at least one separate energy storage device, said device comprising a battery housing for insertion into the frame portion of the bicycle frame, characterized in that the energy storage device has an asymmetric cross section with respect to an energy storage device centre plane, wherein the frame portion has an L-shaped cross section, at least along portions of the frame portion, which extend in a direction perpendicular to said L-shaped cross section, and wherein the cross section of the frame portion and the cross section of the energy storage device complement one another to form a substantially rectangular total cross section.

* * * * *